UNITED STATES PATENT OFFICE.

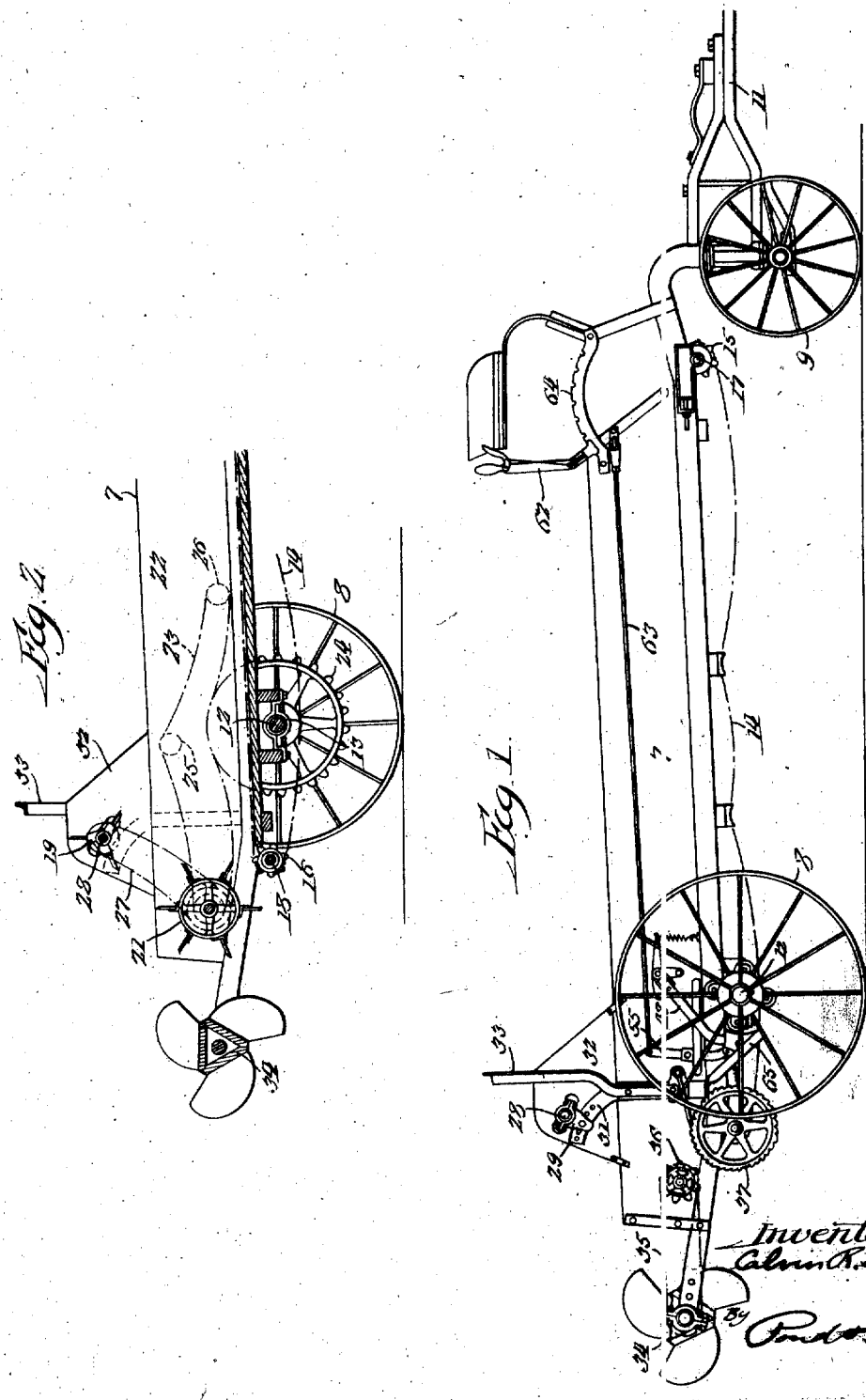

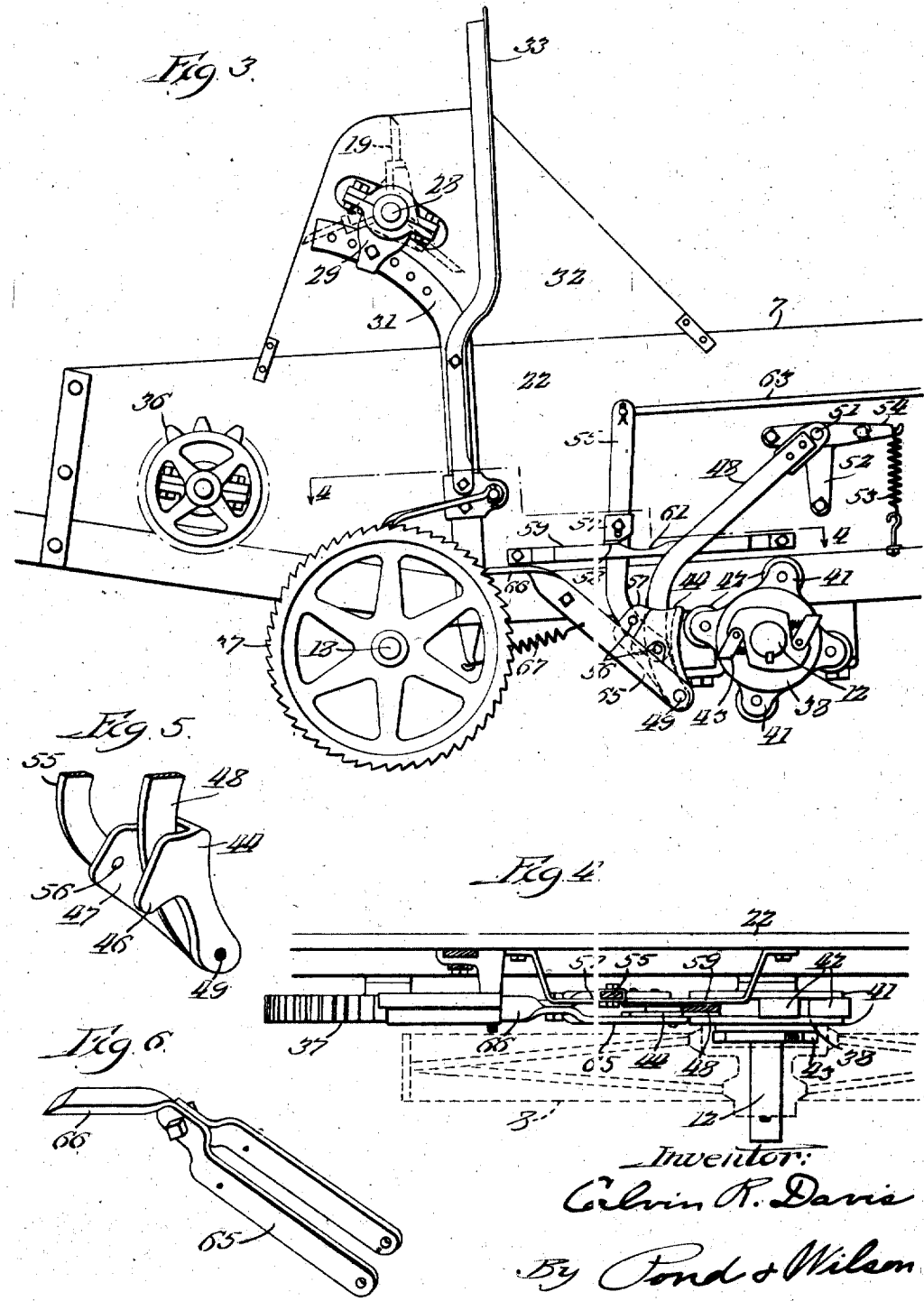

CALVIN R. DAVIS, OF ROCKFORD, ILLINOIS, ASSIGNOR TO EMERSON-BRANTINGHAM COMPANY, OF ROCKFORD, ILLINOIS, A CORPORATION OF ILLINOIS.

INTERMITTENT FEEDING MECHANISM FOR FERTILIZER-DISTRIBUTERS.

1,219,087.   Specification of Letters Patent.   Patented Mar. 13, 1917.

Application filed April 11, 1916. Serial No. 90,483.

*To all whom it may concern:*

Be it known that I, CALVIN R. DAVIS, a citizen of the United States, residing at Rockford, in the county of Winnebago and State of Illinois, have invented certain new and useful Improvements in Intermittent Feeding Mechanisms for Fertilizer-Distributers, of which the following is a specification.

This invention relates to fertilizer distributers of the type employing an endless conveyer and a ratchet mechanism for operating the same to feed fertilizer along the bed to a rotary beater or distributing means and has particular reference to the ratchet feed mechanism. In machines of this character, various variable speed mechanisms, ratchet, gear and otherwise driven, have heretofore been employed for feeding fertilizer to the distributing means fast or slowly as desired so as to spread the requisite amount of fertilizer over a given soil area, but these mechanisms have either been too costly for a low priced fertilizer or distributer or if of cheaper construction have not been able to give the desirable steady and continuous feed.

The primary object of my invention is to provide a fertilizer feed mechanism of the ratchet type which will be simple and durable in construction and capable of adjustment for a wide range of feeds in any of which the feed will be uniform and substantially continuous while the distributer is in motion so that an even distribution of fertilizer is always obtained. To this end, I have provided a ratchet mechanism of comparatively few parts including a driver having a series of tappets adapted to successively actuate a cam shoe that operates the ratchet pawl, these elements being of novel construction and arrangement whereby the pawl will be operated substantially continuously in its feeding movements at a speed determined by the relative relation of the cam shoe and tappets.

My invention also has reference to fertilizer distributers employing upper and lower beaters and contemplates the provision of means whereby the upper beater may be adjusted toward and away from the fertilizer bed so as to operate efficiently on fertilizers of various grades and upon loads of various heights.

Referring to the drawings forming a part of this specification—

Figure 1 is a side elevation of a fertilizer distributer embodying my improvements;

Fig. 2 is a longitudinal sectional view through the rear portion of the distributer;

Fig. 3 is an enlarged side view of the rear end of the distributer with the near drive wheel removed so as to clearly show the ratchet conveyer feed mechanism;

Fig. 4 is a plan sectional view taken on the line 4—4 of Fig. 3; and

Figs. 5 and 6 are detail views in perspective of the cam shoe and pawl arm respectively, of the conveyer feed mechanism.

Since my improvements relate especially to the conveyer feed mechanism and to the beaters, the other elements of the distributer may be of any suitable or preferred design; and for purposes of illustration I have shown a low-down distributer comprising a fertilizer box designated generally by reference character 7 mounted on rear drive wheels 8 and forward dirigible wheels 9. A suitable draft attachment 11 is provided and the drive wheels 8 are journaled on a through axle 12 that is mounted in bearings 13 suitably secured to the underside of the box bottom. An endless conveyer or apron represented diagrammatically by 14 is trained over sprockets 15 and 16 on shafts 17 and 18, respectively, that are suitably journaled on the frame. The conveyer may be of the chain, apron or any other endless type adapted to be moved rearwardly over the bed of the fertilizer box to feed the fertilizer to the distributing means.

In the present instance, the distributing means consists of upper and lower rotary beaters designated generally by characters 19 and 21 respectively, interposed between said panels 22 of the fertilizer box and suitably mounted thereon. The beaters may be suitably driven and I have diagrammatically illustrated in Fig. 2 one form of drive comprising an endless chain 23 engaging the drive wheel sprocket 24 and trained over a sprocket wheel on the lower beater shaft and a pair of small sprocket wheels 25 and 26, the latter of which is adapted to be adjusted vertically to carry the drive chain into and out of engagement with the drive sprocket 24 in a manner well known in this art. An endless chain 27 connects the upper and lower beaters. The shaft 28 carrying the upper beater 19 is journaled at its ends in boxes 29 that are adjustably bolted to arcuate supports 31 secured to the outer sides of the panels 22. The arcuate supports are provided with a series of holes to permit of adjustment of the beater in an arcuate path toward and away from the fertilizer bed without interfering with the chain drive between the beaters. By reason of this adjustment the upper beater may be set at different elevations with respect to the fertilizer bed so as to operate at a proper depth on different grades of fertilizer stacked at different heights in the box.

Side shields or guards 32 are provided at each end of the upper beater and an arched angle bracket 33 holds the upper beater mountings in fixed relative relation. A wide spread attachment consisting of a spiral blade-equipped spreader 34 suitably journaled on the ends of the side sills of the fertilizer box may be driven by an endless chain 35 trained over a sprocket wheel 36 fixed to the lower beater shaft.

The conveyer feed mechanism of the ratchet type consists, generally stated, of a ratchet wheel 37 fixed to the rear conveyer shaft 18 and a pawl device adapted to be operated from one of the drive wheels for rotating the ratchet wheel at a predetermined speed when the fertilizer distributer is in operation. By adjusting the pawl device the conveyer may be set to operate at various speeds so as to deliver the fertilizer more or less rapidly to the revolving beater and consequently, obtain a heavier or lighter distribution of fertilizer. Referring to Figs. 3 and 4, a driver consists of a cylindrical head 38 keyed to the axle 12 in longitudinal alinement with the ratchet wheel 37 and shaped to provide equally spaced radial projections 41 each of which carry a pivotally mounted roller 42. The head 38 carries a set of spring-pressed pawls 43 adapted to engage the internal toothed face of the drive wheel 8 to establish the ordinary ratchet drive between the wheel and driving head. The rollers 42 serve as tappets to successively actuate a pawl device for feeding the ratchet wheel.

The device adapted to be actuated by the tappets consists of a cam shoe designated in general by 44 shaped to provide an arcuate cam face 45 and a pair of rearwardly extending flanges 46 and 47 between which is interposed a pendant 48 pivotally secured at 49 to the cam shoe and pivotally mounted at 51 on a bracket 52 secured above the driving head to the adjacent panel of the fertilizer box. By reason of this construction the cam shoe normally gravitates toward and into the path of the tappets, so that unless such movement is restricted, the cam face 45 will abut against whatever roller may be disposed opposite it. This gravitating movement of the cam shoe is opposed by the tension of a contractile spring 53 connected to an arm 54 fixed to the pendant 48 so that when the cam shoe is moved rapidly back and forth under the influence of the tappets, the spring will have a partial counterbalancing effect to cushion the cam shoe when it strikes the tappets, thus relieving the parts from unnecessary jar and noise incidental to the striking impact. As shown in Fig. 3, the cam face 45 is held out of the path of the tappets by a rod 55 fixedly secured by rivets 56 to the outer side of the flange 47 and equipped with an adjustable stop 57 that rests at 58 on the top surface of a guide bracket 59 secured to the box panel 22. By moving the upper end of the rod 55 forwardly the cam shoe 44 will be adjusted on the pivot 49 relatively to the pendant 48 to move the upper end of the cam face 45 more or less into the path of the tappets. The upper surface of the bracket 59 is cut away at 61 so that when the rod 55 is adjusted forwardly a short distance its stop 57 will enter the depression 61 and permit the cam face 45 to engage the adjacent tappet or roller which limits the forward movement of the cam shoe. A hand lever 62 pivotally mounted on the adjacent panel 22 within reach of the operator is connected by means of a longitudinally adjustable link 63 to the upper end of the rod 55 and equipped with a spring-pressed latch coöperating with a notched segment 64 mounted on said side panel. The various notches except the one in which the lever is engaged in Fig. 1 represent the different speeds at which the conveyer may be driven, the rearmost notch representing the throw out or inoperative position and the foremost notch the highest feed speed. A pawl shank 65, bifurcated as shown in Fig. 6 to straddle the cam shoe, is pivotally connected to the pivot 49 thereof and shaped to provide a pawl head 66 that engages the toothed face of the ratchet wheel. A suitable contractile spring 67 holds the pawl head yieldingly in engagement with the ratchet wheel to prevent displacement of the pawl when the fertilizer distributer is driven over uneven ground. It will be noted, Fig. 4, that the pendant 48 engages the outer face of the bracket 59 while the rod 55 engages the inner face of said bracket so that the cam shoe is thereby held in proper alinement with the tappets and that the pawl arm by reason of its bifurcated construction, is held by the cam shoe in proper alinement with the ratchet wheel. This construction is comparatively simple and by it a substantially continuous feed movement may be imparted to the ratchet wheel at any speed that the device may be set for, as will be presently apparent.

It will be noted that, because of the position of the cam face with respect to the path 1?

of the tappets, movement of the upper end of the cam face by the rod 55 toward or from the tappets does not vary the position of the lower end. Consequently, the entire length of the cam face is presented for engagement by the tappets in any operative position to which the cam may be adjusted. When the lever 62 is adjusted to the first notch for the slowest speed, the stop 57 will be moved into the depression 61 of the bracket 59 and the upper end of the cam face will be disposed slightly in the path of the tappets. It will be evident from the position of the tappets as shown in Fig. 3, that upon making such adjustment the cam shoe will first abut against the adjacent roller and then be moved bodily rearwardly, but after this roller has been moved away from the shoe, the same would drop until its lower end engages the next succeeding roller and the same in being moved upwardly will move the cam shoe rearwardly a distance determined by the projection of the said upper end of the cam face into the path of the roller. This rearward feed movement will be uniformly gradual since the operating roller in effecting the feed must travel along the entire length of the inclined cam face. When the operating roller leaves the cam face the shoe will immediately drop into engagement with the next succeeding roller, thus retracting the pawl. This drop is practically instantaneous, and it will be evident that since the rollers or tappets are being continuously driven and each roller upon engaging the cam shoe commences immediately to feed the same outwardly the break in the feed of the conveyer caused by dropping of the cam shoe is almost imperceptible. Thus, a substantially continuous feed movement is obtained with only one cam shoe and pawl, and it will be evident that as the hand lever 62 is adjusted farther forwardly the upper end of the cam face 45 will be correspondingly projected into the path of the tappets, and consequently, moved backwardly thereby a greater distance to effect greater feed movement of the ratchet wheel at the actuation of each tappet.

Attention is directed to the fact that the cam shoe when out of operative position is supported by the stop 57 on the adjusting rod 55, and that when the lever 62 is moved forwardly to any of the notches the cam shoe immediately becomes a floating element resting at some point within the length of its face 45 on the adjacent roller. It will also be observed that the lower end of the cam shoe is maintained at all times in the same relation to the tappets regardless of the adjustment of the cam for different feeds, so that the drop of the cam shoe to lowermost position is always uniform, that is, it will drop until the lower end of its face 45 abuts against the next approaching roller. For this reason as was pointed out above, the feed movement irrespective of the speed of the feed is always uniformly gradual since at any adjustment of the cam shoe the actuating roller operates on an inclined cam face, so as to effect a feed movement determined by the inclination of such face. In the instance assumed of setting the lever 62 in the first notch the upper end of the cam face 45 will be projected into the path of the tappets sufficiently to cause the pawl to advance the ratchet wheel the distance of one tooth, although by adjusting the link 63 longitudinally with respect to the lever 62 a feed movement of two teeth may be effected when the lever is set at the first notch. As the lever 62 is adjusted forwardly to each succeeding notch the feed movement of the ratchet wheel will be increased the distance of one tooth for each additional notch. This arrangement, however, of adjusting means for securing various speeds of the conveyer may be altered to obtain any variation desirable.

I claim:

1. In a ratchet feed mechanism, the combination of a ratchet wheel, a series of revolving tappets and means adapted to be actuated by the tappets for imparting feed movement to the ratchet wheel, said means being adjustable into and out of the path of the tappets to vary the movement of the ratchet wheel and constructed to be actuated throughout a uniform portion of the cycle of each tappet at any adjustment for variation in degree of feed movement so that the advance feed movement will be uniformly gradual.

2. In a ratchet feed mechanism, the combination of a ratchet wheel, a series of revolving tappets, a floating cam adapted to be actuated by the tappets, the cam being adjustable relatively to the path of the tappets and arranged so that in any of its operative adjustments the tappets will operate upon and throughout the same length of the cam face, and means operable between the cam and ratchet wheel for feeding the latter by operation of the former.

3. The combination with a ratchet wheel and a rotary driver equipped on its periphery with a series of projecting tappets, of a cam shoe disposed in close proximity to the path of said tappets and suspended by a pendant pivotally connected to the lower end of the cam shoe and pivotally mounted on a fixed pivot above the driver, a pawl arm pivotally connected with the cam shoe and adapted to feed the ratchet wheel, and means for adjusting the cam shoe on its said lower pivot relatively to the path of the tappets whereby the shoe will alternately be moved outwardly by a tappet and when the same is passed will drop into the path of the next succeeding tappet and be operated thereby.

4. The combination with a ratchet wheel and a rotary driver equipped on its periphery with a series of projecting tappets, of a cam shoe, means supporting the shoe in proximity to the path of the tappets so that one end of the cam face of the shoe is out of said path and the opposite end is adjustable more or less into said path and so that the tappets will engage the cam shoe throughout a uniform length at any adjustment of the cam shoe, means for so adjusting the cam shoe, and a pawl arm disposed in operative relation to said ratchet wheel and connected with the cam shoe to be moved thereby an amount determined by said adjustment.

5. A ratchet conveyer-feed mechanism for fertilizer distributers comprising a ratchet wheel, a rotary driver equipped with a series of projecting tappets, a cam shoe having an arcuate cam face of a length slightly less than the circumferential distance between adjacent tappets, means supporting the cam shoe in such relation to the tappets that as the driver is rotated each tappet may operate in succession along substantially the entire length of said arcuate cam face to move the cam shoe outwardly the distance that the cam face projects into the path of the tappets, the cam shoe and tappets being relatively adjustable to effect greater or less movement of the cam shoe and the engagement between the tappets and cam shoe being of the same duration under any of said adjustments, and means operable between the cam shoe and ratchet wheel for feeding the latter by said operation of the former.

6. A ratchet conveyer-feed mechanism for fertilizer distributers, comprising a ratchet wheel, a rotary driver equipped with a series of projecting tappets, a cam shoe having an arcuate cam face of a length slightly less than the circumferential distance between adjacent tappets, means supporting the cam shoe in such relation to the tappets that as the driver is rotated each tappet may operate in succession along substantially the entire length of said arcuate cam face to move the cam shoe outwardly the distance that the cam face projects into the path of the tappets, means for adjusting the cam face about a pivot at one end thereof to swing its opposite end more or less into the path of the tappets without changing the length of engagement between the tappets and cam face, and means operable between the cam shoe and ratchet wheel for feeding the latter by said operation of the former.

7. A ratchet conveyer-feed mechanism for fertilizer distributers comprising a ratchet wheel, a rotary driver equipped with a projecting tappet, a cam shoe pivotally suspended from a fixed pivot so as to normally gravitate into the path of the tappet, means for adjusting the cam shoe relatively to its supporting means to project said cam shoe more or less into the said path of the tappet and so that the length of engagement between the cam shoe and tappet at any adjustment is equal, and means operable between the cam shoe and ratchet wheel for feeding the latter as the cam shoe is operated by the tappets.

8. A ratchet conveyer-feed mechanism for fertilizer distributers comprising a ratchet wheel, a rotary driver equipped with a pair of projecting tappets, a cam shoe pivotally suspended from a fixed pivot so as to normally gravitate into the path of the tappets, means counterbalancing the cam shoe in its gravitation into the path of the tappets so as to cushion its engagement with the tappets, means for adjusting the cam shoe and tappets relatively to project the cam shoe more or less into the path of the tappets and so that the length of engagement between the cam shoe and tappet at any adjustment is equal, and means operable between the cam shoe and ratchet wheel for feeding the latter as the cam shoe is operated by the tappets.

9. A ratchet conveyer-feed mechanism for fertilizer distributers comprising a ratchet wheel, a rotary driver equipped with a projecting tappet, a cam shoe pivotally suspended from a fixed pivot so as to normally gravitate into the path of the tappet, means for adjusting the cam shoe about a pivot separate from said fixed pivot to project a portion of the cam face of the shoe more or less into the path of the tappet, the cam face being so supported that a uniform length thereof will be engaged by the tappet at any adjustment of the cam shoe, and means operable between the cam shoe and ratchet wheel for feeding the latter as the cam shoe is operated by the tappet.

10. The combination of a ratchet wheel, a rotary driver having a series of circumferentially spaced rollers, a cam shoe adapted to be actuated by said rollers as the driver is rotated, a pawl arm connected to said cam shoe for imparting feed movement to the ratchet wheel upon actuation of the cam shoe, said cam shoe being adjustable more or less into the path of said rollers so as to impart greater or less feed movement to the ratchet wheel and being arranged so that said rollers engage the cam shoe throughout a substantially equal portion of their cycle at any adjustment of said shoe, whereby to effect substantially continuous rotation of the ratchet wheel from continuous rotation of the driver.

11. In a ratchet conveyer-feed mechanism for fertilizer distributers, the combination with a toothed apron feed wheel, rotary driving means provided with a series of tappets, a cam shoe and means supporting the same so that the shoe is capable of a back and forth movement, a feed arm or pawl connected with said cam and coöperating with the toothed wheel so as to be operated by movement of said cam to impart rotary motion to said wheel, and means for adjusting the cam independently of the said pawl to project the cam more or less into the path of the said tappets whereby to vary the feed of the apron.

12. In a ratchet conveyer-feed mechanism for fertilizer distributers, the combination with a toothed apron feed wheel, rotary driving means provided with a series of tappets, a cam adapted to be moved outwardly by each tappet and thence inwardly into the path of the succeeding tappet, as the drive means is rotated, a pawl arm connected to the same and adapted to impart rotary motion to the feed wheel by the said operation of the cam, and means for adjusting the cam independently of the pawl arm more or less into the path of the tappets whereby to vary the feed of the apron.

CALVIN R. DAVIS.